United States Patent [19]

Buford, III et al.

[11] Patent Number: 5,257,296

[45] Date of Patent: Oct. 26, 1993

[54] STEAM GENERATOR CHEMICAL SOLVENT MIXING SYSTEM AND METHOD

[76] Inventors: Albert C. Buford, III, Rte. 4, Box 170A, Cabot, Ark. 72023; Donal W. Moore, 609 S. Phoenix, Russellville, Ark. 72801; Sterling J. Weems, 3933 Oliver St., Chevy Chase, Md. 20815; John B. Mason, 10120 W. Argent, Pasco, Wash. 99301

[21] Appl. No.: 783,621

[22] Filed: Oct. 25, 1991

[51] Int. Cl.$^5$ .............................................. G21C 19/42
[52] U.S. Cl. ..................... 376/310; 376/316; 376/305; 376/372
[58] Field of Search ............... 376/316, 305, 310, 372; 122/383, 381, 382; 134/22.12, 37, 61; 165/95; 976/DIG. 376, DIG. 379

[56] References Cited

U.S. PATENT DOCUMENTS

| | | | |
|---|---|---|---|
| 3,311,565 | 3/1967 | Michael | 252/301.1 |
| 3,496,017 | 2/1970 | Weed | 134/2 |
| 3,664,870 | 5/1972 | Oberhofer et al. | 134/3 |
| 3,737,373 | 6/1973 | Motojima et al. | 176/37 |
| 3,873,362 | 3/1975 | Mihram et al. | 134/3 |
| 3,895,465 | 7/1975 | Korn et al. | 51/320 |
| 3,900,010 | 8/1975 | Stiteler et al. | 122/32 |
| 4,042,455 | 8/1977 | Brown | 176/37 |
| 4,079,701 | 3/1978 | Hickman et al. | 122/382 |
| 4,320,528 | 3/1982 | Scharton et al. | 376/310 |
| 4,326,317 | 4/1982 | Smith et al. | 15/302 |
| 4,424,769 | 1/1984 | Charamathieu et al. | 122/392 |
| 4,498,427 | 2/1985 | Todd | 122/379 |
| 4,632,705 | 12/1986 | Baum | 134/3 |
| 4,645,542 | 2/1987 | Scharton et al. | 134/1 |
| 4,655,846 | 4/1987 | Scharton et al. | 134/1 |
| 4,663,085 | 5/1987 | Enda et al. | 252/626 |
| 4,699,665 | 10/1987 | Scharton et al. | 134/1 |
| 4,706,613 | 11/1987 | Smith, Jr. | 122/32 |
| 4,715,324 | 12/1987 | Muller et al. | 122/381 |
| 4,756,770 | 7/1988 | Weems | 134/37 |
| 4,773,357 | 9/1988 | Scharton et al. | 122/382 |
| 4,899,697 | 2/1990 | Franklin et al. | 122/379 |
| 4,921,662 | 5/1990 | Franklin et al. | 376/316 |
| 4,972,805 | 11/1990 | Weems | 122/383 |

*Primary Examiner*—Donald P. Walsh
*Assistant Examiner*—Meena Chelliah
*Attorney, Agent, or Firm*—Robert C. Tucker; William David Kiesel

[57] ABSTRACT

A steam generator chemical solvent mixing system and method is provided. The chemical solvent mixing system includes a pump, having a discharge port fluidly connected to a discharge line and a suction port fluidly connected to a suction line. An upper level injector, including an injector nozzle extends through one upper access opening in the outer casing of a steam generator and extends into the annulus of the generator between the tube bundle shroud and the outer casing, the upper level injector being fluidly connected to the discharge port of the pump. A lower access eductor is provided, including an eductor nozzle extending through one lower access opening of the outer casing and adapted to discharge solvent through one passageway in the tube bundle shroud and into the tube bundle of the generator, the lower access eductor being fluidly connected to the discharge port of the pump. A gas injection line is provided, fluidly connected at one end to a gas source and at the other end to the lower access eductor. A return line fluidly connects at one end to a second lower access opening and at the other end to the suction port of the pump. A method for chemically cleaning a steam generator is also provided utilizing the system to fill the steam generator with solvent and circulate the solvent within the generator.

6 Claims, 5 Drawing Sheets

STEAM GENERATOR CHEMICAL SOLVENT MIXING SYSTEM AND METHOD

BACKGROUND OF THE INVENTION

Field of the Invention.

This invention relates generally to chemical solvent cleaning systems and methods and, more particularly, to chemical solvent cleaning systems and methods for use in steam generators used in nuclear power generation to monitor the corrosive effects of chemical solvent cleaning of steam generators.

Prior Art.

Certain nuclear power stations using pressurized water reactor technology utilize a large heat exchanger, known as a steam generator, to transfer heat from the reactor coolant system (i.e. heat generated during nuclear fission) to a secondary system. The heat transfer results in the boiling of secondary steam feedwater, which produces steam to drive the plant's turbine, which in turn powers the electric generator. The steam is then condensed and returned to the steam generator in a continuous recirculation loop. The secondary feedwater contains trace quantities of contaminants, primarily iron oxide, which tend to plate out inside the steam generator, eventually resulting in flow blockage, corrosion, and/or loss of heat transfer capability. An emerging mitigation method for removing such contaminants involves the use of a chemical solvent, usually during unit shutdown, to dissolve the contaminants.

The thermal efficiencies of steam generators are reduced due to accumulations of iron and copper corrosion deposits. In actual operation at Arkansas Nuclear One—Unit 1 (ANO-1) at Russelville, Ark., it was observed that such deposits occurred primarily between the fourth and ninth tube support plates of the once through steam generators (OTSG's) at ANO-1. Highly effective, low corrosive solvents for removing iron and copper deposits have been developed through a program sponsored by the Steam Generator Owners Group (SGOG), and the Electric Power Research Institute (EPRI).

Prior art chemical cleanings of OTSG's utilize a process known as a "fill, soak and drain" (F/S/D) process. Some recirculation-type steam generators are cleaned using a circulation method, but only to clean the very lowest parts of the generator. F/S/D was developed to assure adequate mixing of solvent between the inner tube bundle of an OTSG and the annulus region (between the outer shell and inner shroud of the generator). This method, while effective for mixing, increased the overall time and thus the cost of the cleaning process by requiring additional steps to be performed throughout the cleaning process. Further, temperature differentials in the solvent between the top and bottom of the steam generator, as well as solvent stagnation in the annulus region of the generator created concerns about the effectiveness of F/S/D. F/S/D requires additional intermediate heating steps due to the time required to empty the generator. These intermediate steps further increased the overall time for the cleaning process as well as the amount of waste generated by the process. Further, F/S/D methods often use a high initial solvent temperature to offset cooling which takes place during the process, which can result in increased corrosion of internal steam generator components. A cleaning system and method was needed to assure adequate mixing of fresh solvent throughout the relevant portions of the steam generator.

SUMMARY OF THE INVENTION

Therefore, it is an object of this invention to provide a steam generator chemical solvent mixing system and method which increases mixing of chemical solvent within the steam generator It is another object of this invention to provide a steam generator chemical solvent mixing system and method which maintains a more constant solvent temperature within the steam generator.

It is still another object of this invention to provide a steam generator chemical solvent mixing system and method which is easily operable within a steam generator without substantial modifications to the steam generator.

It is a further object of this invention to provide a steam generator chemical solvent mixing system and method which is economical and efficient to operate and administer.

It is still a further object of this invention to provide a steam generator chemical solvent mixing system and method which accomplishes various combinations of the above objects.

Accordingly, a chemical solvent mixing system is provided in combination with a steam generator. The steam generator generally includes a plurality of generator tube support plates, each generator tube support plate having a plurality of openings. A plurality of generator tubes form a tube bundle, with each generator tube passing through aligned openings in the support plates. An outer casing surrounds the tube bundle and the generator tube support plates, the outer casing having an upper end and a lower end, upper access openings between the upper and lower ends, and lower access openings near the lower end. A tube bundle shroud, having an upper end and a lower end and a plurality of passageways in the lower end surrounds the tube bundle between the outer casing and the tube bundle. The tube bundle shroud forms an annulus between the outer casing and the shroud.

The chemical solvent mixing system includes a pump, having a discharge port fluidly connected to a discharge line and a suction port fluidly connected to a suction line. An upper level injector, including an injector nozzle extends through one upper access opening in the outer casing and extends into the annulus, the upper level injector being fluidly connected to the discharge port of the pump. A lower access eductor is provided, including an eductor nozzle extending through one lower access opening and adapted to discharge solvent through one passageway in the tube bundle shroud and into the tube bundle, the lower access eductor being fluidly connected to the discharge port of the pump. A gas injection line is provided, fluidly connected at one end to a gas source and at the other end to the lower access eductor. A return line fluidly connects at one end to a second lower access opening and at the other end to the suction port of the pump. A method for chemically cleaning a steam generator is also provided utilizing the system to fill the steam generator with solvent and circulate the solvent within the generator.

DETAILED DESCRIPTION OF PREFERRED EMBODIMENTS OF THE INVENTION

Figure 1:
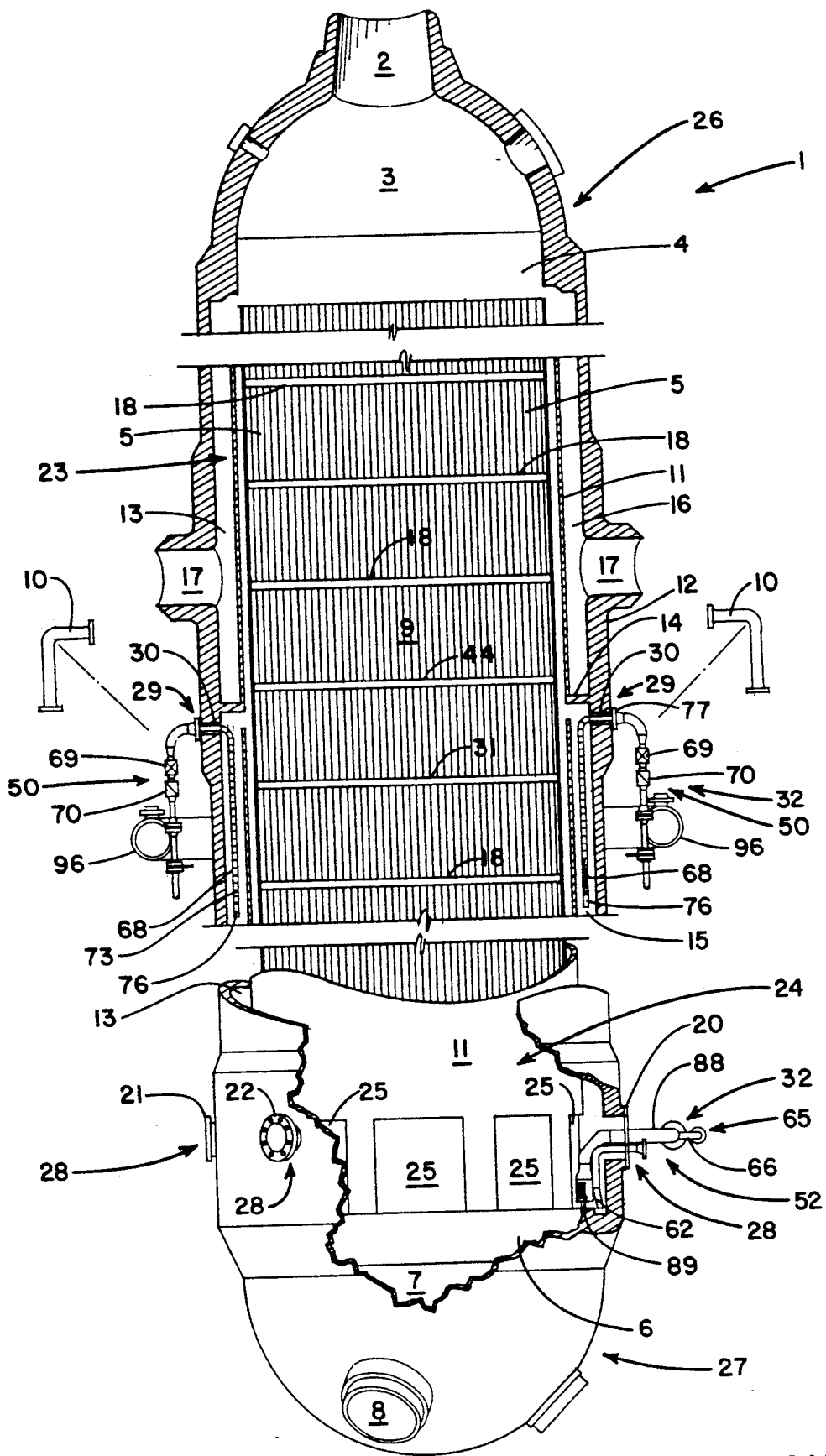
FIG. 1 is a partial cutaway view of a steam generator With the mixing system of the invention installed thereon.

FIG. 1 depicts a conventional once through steam generator 1, commonly referred to as an "OTSG." The OTSG of FIG. 1 is similar to an OTSG manufactured by Babcock and Wilcox, Model 177 FA as well as the OTSG described in U.S. Pat. No. 4,158,387, the OTSG's at ANO in Russelville, Ark. and others known in the art. The term "OTSG" is used herein interchangeably with the term "steam generator" (or "SG") in that the cleaning and mixing system disclosed may be used in many types of steam generators. The OTSG 1 is a large tube bundle heat exchanger. Heated primary coolant water from the nuclear reactor core enters OTSG 1 through primary inlet 2 into an inlet chamber 3, where it is distributed by upper tubesheet 4 through a plurality of generator tubes 5 and collected at lower tubesheet 6. From lower tubesheet 6 the primary water flows into outlet chamber 7 and then through primary outlet 8, from which it returns to the reactor core to be reheated. The generator tubes 5 are collectively referred to as a tube bundle 9. Tube bundle 9 typically contains thousands of generator tubes 5.

Heat from generator tubes is transferred to secondary feedwater which is injected into the OTSG 1 through main feedwater nozzles 10. Tube bundle shroud 11, having an upper end 23 and a lower end 24, surrounds tube bundle 9. Outer casing 12, having an upper end 26 and a lower end 27, surrounds tube bundle shroud 11. An annulus 13 is thus formed between shroud 11 and casing 12. A partition ring 14 separates the annulus 13 into a downcomer annulus 15 and a steam annulus 16. Secondary feedwater is injected into downcomer annulus 15 through feedwater nozzles 10 (shown in an exploded and removed position in FIG. 1), moves downward through downcomer annulus 15 and into tube bundle 9 through passageway 25 in lower end 24 of shroud 11, and then moves upward through tube bundle 9 within shroud 11. Steam is formed a secondary feedwater rises within shroud 11 and is heated by generator tubes 5. Steam then exits the OTSG through steam annulus 16 and steam outlets 17.

Figure 2:
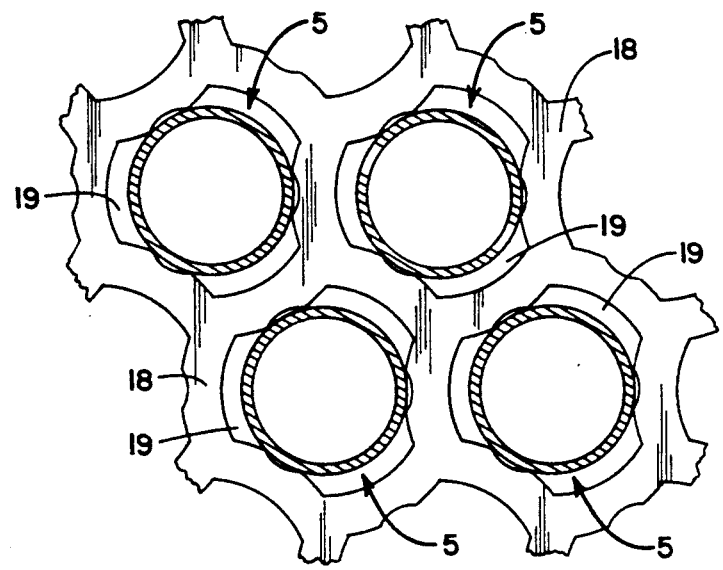
FIG. 2 is a partial sectional view of a tube support plate and steam generator tubes taken along section line 2 of FIG. 1.
Figure 3:
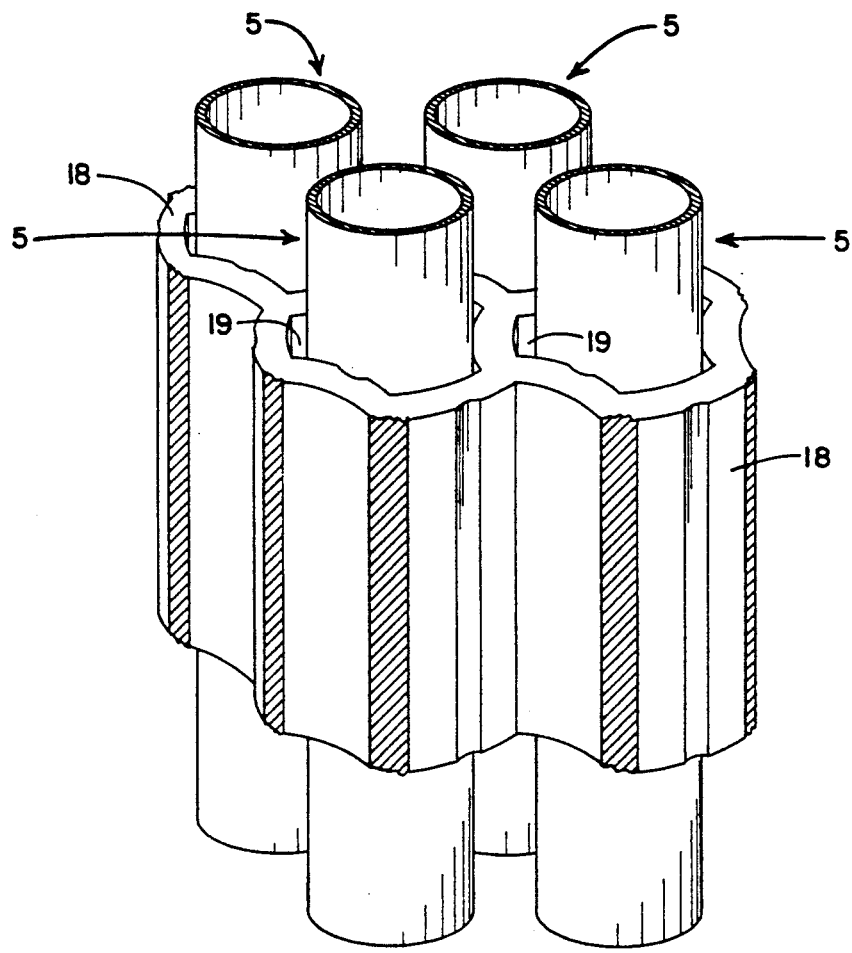
FIG. 3 is a perspective view of the section shown in FIG. 2.

As shown in FIGS. 1-3, generator tubes 5 are held in place by a plurality of generator tube support plates 18. Generator tube support plates 18 may take various forms, and are rigid support structures which allow secondary feedwater to flow around generator tubes 5 while providing stability to the tube bundle 9. Secondary feedwater flows through openings 19 (such as the broached openings shown in FIGS. 2 and 3) in tube support plates 18. It should be understood that the term "tube support plate" refers to any tube support structure which performs the same function as those shown in the Figures, including without limitation drilled plates, support crates, support strips or similar structures. Chemical cleaning operations are aimed at removing sludge which has built up in openings 19 or sludge which has deposited on tubes 5 and reduced the heat transfer capability of the SG.

Access to the interior of OTSG 1 is severely limited. When chemical cleaning takes place, chemical solvent is pumped into OTSG 1 typically through a lower access opening 28 such as manway 20. Solvent exits OTSG 1 at another lower access opening 28, such as handhole 21. Typically, limited access through lower end 27 of outer casing 12 is provided through other handholes around the periphery of OTSG 1, such as handhole 22 shown in FIG. 1, with similar handholes located on the opposite side of OTSG 1. Access through outer casing 12 may also be provided through upper access openings 29, such as feedwater nozzle openings 30.

As stated above, the thermal efficiencies of OTSG's have been reduced due to accumulations of iron and copper corrosion deposits. At ANO-1, these deposits were located primarily between the fourth and ninth tube support plates 18 which are located below the main feedwater nozzles 10. Chemical solvents should therefore be applied to a level just above the highest affected tube support plate 18, such as the ninth tube support plate 31 at ANO-1. The cleaning and mixing system 32 comprises temporary, transportable, process equipment shown schematically in FIG. 4. After the iron and copper solvent applications, the OTSG 1 should be rinsed to its full height. The chemical application sequence generally includes alternate applications of solvent and rinse solutions to the SG 1.

Figure 4:
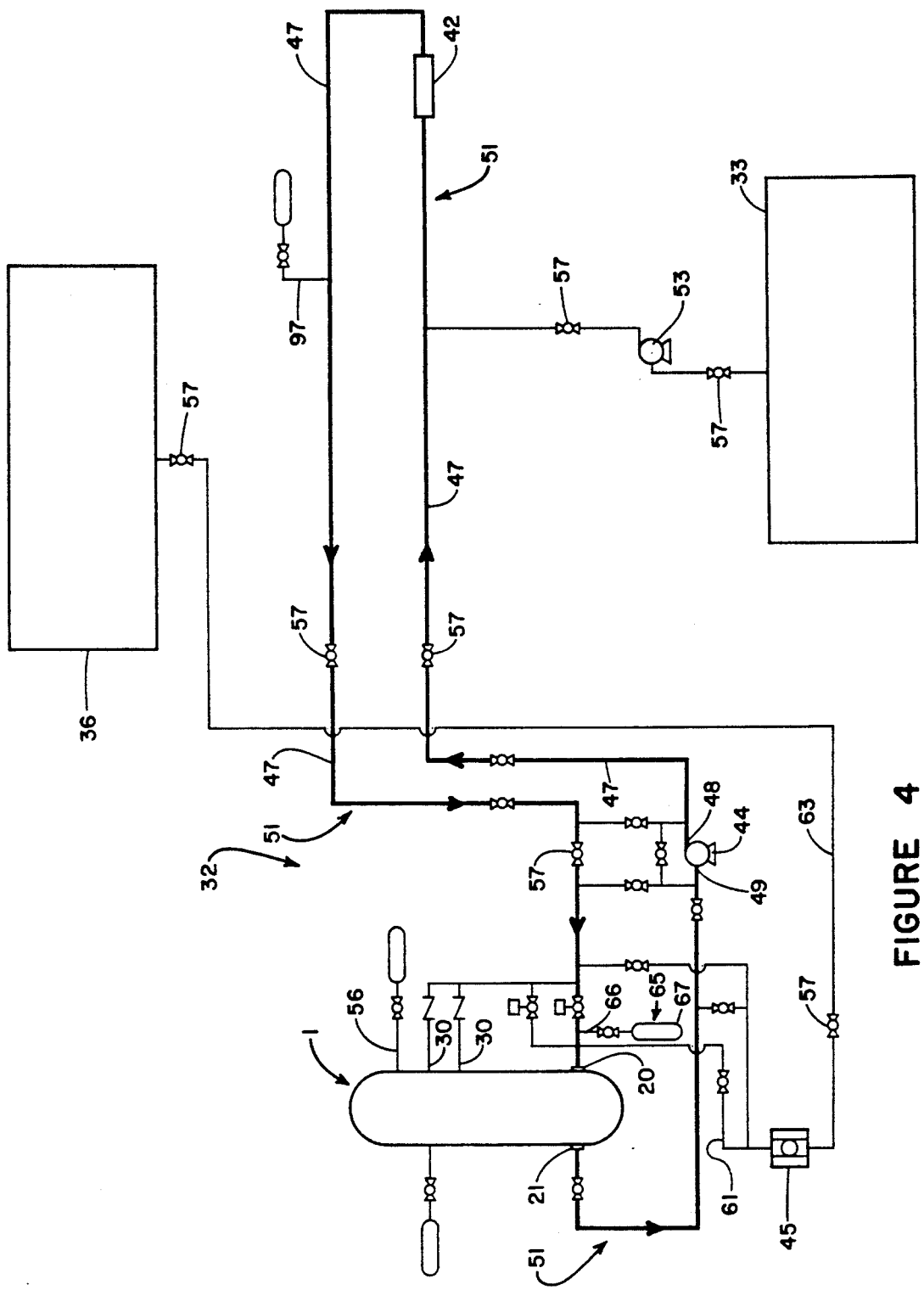
FIG. 4 is a diagrammatic illustration of an embodiment of the mixing system of the invention.

The major portion of the processing equipment, including the chemical mix tanks 33, waste tanks 36, heating and cooling equipment 42, and process monitoring and controls (not shown) are locatable outside of containment in a temporary laydown area. The balance of the equipment, including the main recirculation pump 44 and the OTSG draindown pumps 45 are located inside containment adjacent to the SG 1. As shown in FIG. 4, there are numerous valves 57 in system 32 which must be set in accordance with the desired flow during system operation. Man other valves (not shown) may be required for redundancy and safety.

A loop 51 formed by lines 46 and 47 fluidly connects the equipment in the main processing area outside containment with the OTSG inside containment. Suction line 46 fluidly connects to the main recirculation pump 44 suction port 49. Thus, suction port 49 of pump 44 fluidly connects to handhole 21 on SG 1. Discharge line 47 fluidly connects to discharge port 48 and to manway 20 on OTSG 1 as well as to two upper level injectors 50 on OTSG 1. Lower access eductor 52 extends into OTSG 1 through manway 20. Temporary piping connecting the system 32 to OTSG 1 ar made prior to the start of the cleaning.

During fill and drain operations, lines 46 and 47 may be operated in parallel, with all flow entering or exiting OTSG 1 through the lower access openings 28. During recirculation of solvent rinse fluids in loop 51 the flow in lines 46 and 47 is in opposite directions with respect to OTSG 1. Suction line 46 receives fluid from OTSG 1, and discharge line 47 conducts fluid out to the cleaning equipment in the processing area, and back to OTSG 1. During recirculation, a portion of the flow through discharge line 47 can be directed up through the two upper level injectors 50 to prevent stagnation of the fluid inside downcomer annulus 15. The balance of the flow enters the SG 1 at the bottom through lower access eductor 52 at manway 20. Main recirculation pump 44, will provide recirculation flow through loop 51. During fill operations, main recirculation pump 44 will be bypassed, and the appropriate mix tank pump 53 will be used to fill OTSG 1.

Periodic gas sparging, preferably with nitrogen, is used to enhance vertical mixing inside the tube bundle 9. Gas sparging system 65, including gas supply tank 67 and gas sparge line 66, disperses nitrogen in the form of fine bubbles into the recirculation flow as it enters the bottom of OTSG 1 through lower access eductor 52. Nitrogen flow rate during sparging is preferably 1–5 cfm, and can vary according to the desired mixing effect. Vent line 56 provides a vent for nitrogen used in sparging.

Figure 5:
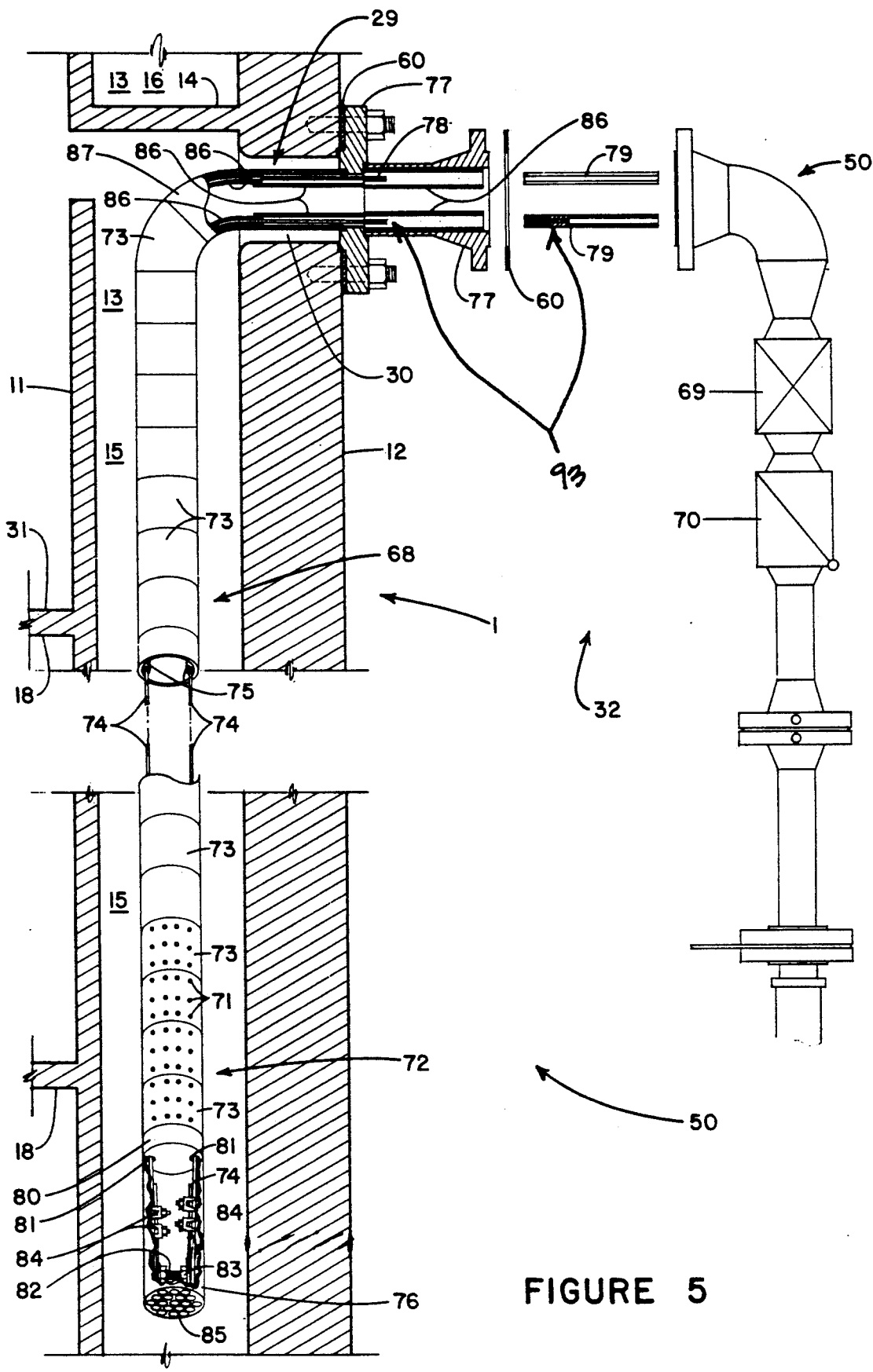
FIG. 5 is a perspective view of an embodiment of the upper level injector of the invention.

A more detailed view of the upper level injector 50 of the invention is shown in FIG. 5. It is necessary that the upper level injector nozzle 68 fit into an upper access opening 29, such as main feedwater nozzle opening 30, and down into downcomer annulus 15. Because of the extremely tight space requirements, nozzle 68 was designed to allow for such installation. For optimum operation, nozzle 68 should extend downward in downcomer annulus 15 to a point where the lower portion 72 will be submersed in solvent during cleaning in order to prevent splashing and foaming. At ANO-1, this was a point below the ninth tube support plate 31. It is preferable that two upper level injectors 50 are utilized, spaced 180 degrees apart, as shown in FIG. 1. The purpose of upper level injectors 50 is to provide fresh solvent circulation down through downcomer annulus 15 and into tube bundle 9, thus maximizing the effectiveness of the solvent and minimizing cleaning time. Each upper level injector 50 preferably includes an operation valve 69, a check valve 70 to prevent backflow of solvent, tubular nozzle flange 77 and nozzle 68. Nozzle 68 is preferably provided with side perforations 71 on one side only to direct solvent in a circular flow around downcomer annulus 15. The nozzle 68 shown in FIG. 5 is the right-hand nozzle shown in FIG. 1. Thus, the flow induced by the two nozzles 68 is in a clockwise direction around downcomer annulus 15. The circular flow induced by nozzles 68 ensures mixing of solvent in downcomer annulus 15 as it flows downward and is drawn into tube bundle 9 by the solvent flow from lower access eductor 52.

Nozzle 68 includes multiple tubular sections 73, connected by two cables 74, which pass through guide sleeves 75 in each tubular section 74. Cables 74 are anchored in anchor section 76 and terminate at tubular nozzle flange 77. In tubular nozzle flange 77, cables 74 run through guide sleeves 86 and are provided with threaded end connections 78, which are tightened by long cable nuts 79. Threaded end connections 78 and cable nuts 79 serve as a turnbuckle means 93 for tightening cables 74. Other means known in the art may be substituted as turnbuckle means 93. As stated above, tubular sections 73 in the lower portion 72 have side perforations 71 for dispersing solvent. Lower portion 72 terminates at end plate 80, which is provided with holes 81 for cables 74. Anchor section 76 includes an anchor bolt 82 which secures a cable loops 83, which are in turn secured by cable clamps 84. A perforated drain plate 85 allows anchor section 76 to self-drain when removed from SG 1.

Installation of upper level injectors 50 is relatively simple. The two feedwater nozzles 10, which are replaced by injectors 50, are first removed and stored. On each injector nozzle 68, cable nuts 79 are loosened and anchor section 76, followed by tubular sections 73 and the leading end 87 of tubular nozzle flange 77 is fed into the vacant upper access opening 29. Thus, nozzle 68 is hanging loosely in downcomer annulus 15. Cable nuts 29 are then tightened causing nozzle 68 to become a rigid structure, the remainder of injector 50 is attached to tubular nozzle flange 77, and injector 50 is ready for use. Gaskets 60 provide the necessary seals.

Figure 6:
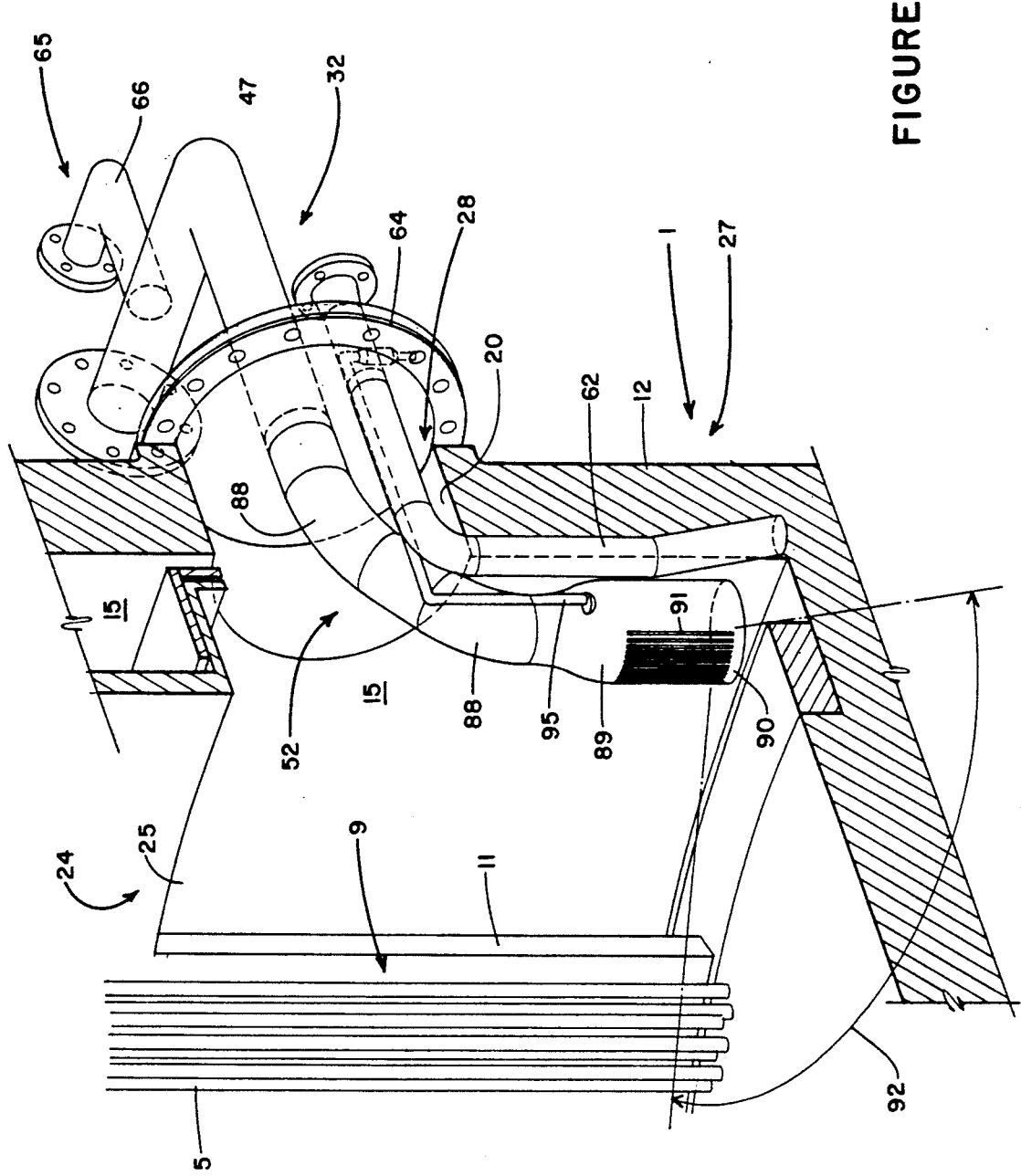
FIG. 6 is a perspective view of an embodiment of the lower access eductor of the invention.

FIG. 6 depicts lower access eductor 52 installed in manway 20. As shown, eductor 52 includes a tubular member 88 which extends into downcomer annulus 15 and terminates at an eductor nozzle 89. Eductor nozzle 89 disperses and directs flow from eductor 52 into passageway 25 in lower end 24 of shroud 11. Eductor nozzle 89 is provided with a closed end 90 and radial slots 91. Radial slots 91 extend to an angular width 92 sufficient to direct solvent flow through the entire width of passageway 25. Gas sparge line 66 ties into tubular member 88 outside of SG 1 and introduces nitrogen into the solvent flow. Fine bubbles of nitrogen are dispersed throughout the solvent which is directed into tube bundle 9 by eductor nozzle 89, causing a rising action in the solvent within tube bundle 9. Solvent flow from eductor nozzle 89 also draws fresh solvent from downcomer annulus 15 (flowing down from injectors 50) into tube bundle 9. Excellent mixing results from the flow combination created by injectors 50 and lower access eductor 52. Nitrogen is vented through main vent line 56, and solvent exits the SG 1 through handhole 21. Drain tube 62 allows SG 1 to be drained below the level of eductor nozzle 89, and level indicator tube 95 is used to determine the level of solvent within SG 1. Gasket 64 provides a seal between eductor 52 and OTSG 1.

After filling of the OTSG 1 with solvent or rinse solution, the cleaning system valves 57 are placed in recirculation mode, and main recirculation pump 44 is started to provide recirculation flow. The loop heater/cooler 42 may be placed on line to begin any necessary heating or cooling of the system. Nitrogen sparging of a first portion of the recirculation flow through eductor 52 is performed periodically during the heatup and during recirculation of fluids to improve fluid mixing in tube bundle 9 and to prevent temperature stratification within the SG 1. A second portion of the flow is diverted up through the two upper level injectors 50 to ensure fluid changeout inside the downcomer annulus 15.

When a cleaning step is complete, the spent solvent is drained to waste tanks 36. Draindown pumps 45, connected to drain suction line 61 and drain discharge line 63, inside containment are used to remove the residual solvent from the SG 1 and process lines inside containment.

As can be seen, a mixing and cleaning system and method has been disclosed which provides increased, efficient mixing in steam generators. Other alternate embodiments of the invention will occur to those skilled in the art, and are intended to be included within the scope and spirit of the following claims.

We claim:
1. In nuclear a steam generator, including:
i. a plurality of generator tube support plates, each said generator tube support plate having a plurality of openings;

ii. a plurality of generator tubes forming a tube bundle, each said generator tube passing through aligned said openings in said support plates;

iii. an outer casing surrounding said tube bundle and generator tube support plates, said outer casing having an upper end and a lower end, upper access openings between said upper and lower ends, and lower access openings near said lower end; and iv. a tube bundle shroud, having an upper end and a lower end and a plurality of passageways in said lower end, surrounding said tube bundle between said outer casing and said tube bundle, said tube bundle shroud forming an annulus between said outer casing and said shroud;

a chemical solvent mixing system, comprising:

a. a pump, having a discharge port fluidly connected to a discharge line and a suction port fluidly connected to a suction line;

b. a discharge line, fluidly connected to said discharge port of said pump;

c. an upper level injector, including an injector nozzle extending through one said upper access opening and extending into said annulus, said upper level injector being fluidly connected to said discharge line;

d. a lower access eductor, including an eductor nozzle extending through one said lower access opening and adapted to discharge solvent through one said passageway in said tube bundle shroud and into said tube bundle, said lower access eductor being fluidly connected to said discharge line;

e. a gas injection line, fluidly connected at one end to a gas source and at the other end to said lower access eductor; and f. a return line, fluidly connected at one end to a second said lower access opening and at the other end to said suction port of said pump.

2. A combination according to claim 1, wherein said injector nozzle comprises:

i. a tubular nozzle flange, fluidly connectable to said discharge line and attachable to said outer casing such that said tubular nozzle flange extends through one said upper access opening into said annulus, said tubular nozzle flange further having a plurality of guide sleeves fixedly attached therein;

ii. a plurality of tubular sections, each said tubular sections having a plurality of guide sleeves fixedly attached therein;

iii. an anchor section;

iv. a plurality of cables, each said cable having one end attachable to said anchor section and another end attachable to a turnbuckle means, said cables passing through said guide sleeves in said tubular sections and said tubular nozzle flange;

v. a turnbuckle means for tightening said cables, attachable to said cables; and wherein at least one of said tubular sections is provided with a plurality of perforations therein so as to permit fluid flow through said tubular sections into said annulus.

3. A combination according to claim 1, wherein said lower access eductor comprises:

i. a tubular member, fluidly connectable to said discharge line and said gas injection line and attachable to said outer casing such that said tubular member extends through one said lower access opening into said annulus; and ii. an eductor nozzle, fluidly connected to said tubular member and adapted to fit within said annulus, said eductor nozzle having a plurality of radial slots formed therein so as to direct fluid flow from said eductor nozzle into one said passageway.

4. A combination according to claim 3, wherein said lower access eductor comprises:

i. a tubular member, fluidly connectable to said discharge line and said gas injection line and attachable to said outer casing such that said tubular member extends through one said lower access opening into said annulus; and ii. an eductor nozzle, fluidly connected to said tubular member and adapted to fit within said annulus, said eductor nozzle having a plurality of radial slots formed therein so as to direct fluid flow from said eductor nozzle into one said passageway.

5. In a nuclear steam generator, including:

i. a plurality of generator tube support plates, each said generator tube support plate having a plurality of openings;

ii. a plurality of generator tubes forming a tube bundle, each said generator tube passing through aligned said openings in said support plates;

iii. an outer casing surrounding said tube bundle and generator tube support plates, said outer casing having an upper end and a lower end, upper access openings between said upper and lower ends, and lower access openings near said lower end; and iv. a tube bundle shroud, having an upper end and a lower end and a plurality of passageways in said lower end, surrounding said tube bundle between said outer casing and said tube bundle, said tube bundle shroud forming an annulus between said outer casing and said shroud;

an injector nozzle, comprising:

a. a tubular nozzle flange, fluidly connectable to said discharge line and attachable to said outer casing such that said tubular nozzle flange extends through one said upper access opening into said annulus, said tubular nozzle flange further having a plurality of guide sleeves fixedly attached therein;

b. a plurality of tubular sections, each said tubular sections having a plurality of guide sleeves fixedly attached therein;

c. an anchor section;

d. a plurality of cables, each said cable having one end attachable to said anchor section and another end attachable to a turnbuckle means, said cables passing through said guide sleeves in said tubular sections and said tubular nozzle flange;

e. a turnbuckle means for tightening said cables, attachable to said cables; and wherein at least one of said tubular sections is provided with a plurality of perforations therein so as to permit fluid flow through said tubular sections into said annulus.

6. In a nuclear steam generator, including:

i. a plurality of generator tube support plates, each said generator tube support plate having a plurality of openings;

ii. a plurality of generator tubes forming a tube bundle, each said generator tube passing through aligned said openings in said support plates;

iii. an outer casing surrounding said tube bundle and generator tube support plates, said outer casing having an upper end and a lower end, upper access openings between said upper and lower ends, and lower access openings near said lower ends; and iv. a tube bundle shroud, having an upper end and a lower end and a plurality of passageways in said lower end, surrounding said tube bundle between said outer casing and said tube bundle, said tube bundle shroud forming an annulus between said outer casing and said shroud;

a chemical solvent mixing method, comprising the steps of:

a. filling said steam generator with liquid to a level such that a desired number of said tube support plates are submerged in said liquid;

b. establishing a recirculation flow of said liquid, wherein said liquid is discharged from said steam generator, and said liquid is recirculated back into said steam generator, with a first portion of said liquid being directed through at least one said lower access opening into said tube bundle through one said passageway, and a second portion of said liquid being directed through at least one said upper access opening into said annulus; and

* * * * *